United States Patent [19]

Passalenti et al.

[11] 4,159,285
[45] Jun. 26, 1979

[54] HARDENABLE COMPOSITIONS COMPRISING AN UNSATURATED EPOXY ESTER AND AN ETHYLENICALLY UNSATURATED MONOMER

[75] Inventors: Beppino Passalenti, Lissone; Silvio Vargiu, Casatenovo, both of Italy

[73] Assignee: Societa' Italiana Resine S.I.R. S.p.A., Milan, Italy

[21] Appl. No.: 792,955

[22] Filed: May 2, 1977

[30] Foreign Application Priority Data

Apr. 30, 1976 [IT] Italy .............................. 22905 A/76

[51] Int. Cl.² .............................................. C08L 63/00
[52] U.S. Cl. .................................. 260/837 R; 260/836
[58] Field of Search ................................. 260/836, 837

[56] References Cited

U.S. PATENT DOCUMENTS

| | | | |
|---|---|---|---|
| 3,301,743 | 1/1967 | Fekete | 260/836 |
| 3,317,465 | 5/1967 | Doyle | 260/836 |
| 3,373,075 | 3/1968 | Fekete | 260/837 R |
| 3,377,406 | 4/1968 | Newey | 260/837 R |
| 3,564,074 | 2/1971 | Swisher | 260/836 |
| 3,634,542 | 1/1972 | Dowd | 260/837 R |
| 3,836,600 | 9/1974 | Brewbaker | 260/836 |

*Primary Examiner*—Paul Lieberman
*Attorney, Agent, or Firm*—Sughrue, Rothwell, Mion, Zinn and Macpeak

[57] ABSTRACT

A composition hardenable by means of organic peroxides, comprising an unsaturated epoxy resin and an ethylenically unsaturated monomer copolymerizable with the latter, said monomer being present in the composition in an amount of from 0.4 to 2 parts by weight for each part by weight of said resin, and said resin being the reaction product of an unsaturated monocarboxylic acid or a monoester of an unsaturated bicarboxylic acid with the epoxidation product of epichlorohydrin and a novolak phenolic resin of the structural formula:

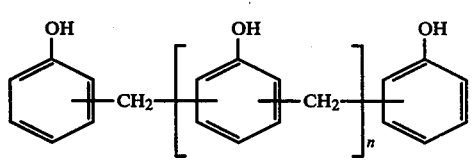

wherein n has an average value of from 0.1 to 0.7.

13 Claims, No Drawings

HARDENABLE COMPOSITIONS COMPRISING AN UNSATURATED EPOXY ESTER AND AN ETHYLENICALLY UNSATURATED MONOMER

The present invention relates to a composition hardenable by means of peroxides, which comprises an unsaturated epoxy ester and an ethylenically unsaturated monomer.

It is known in the art how to react a polyepoxy compound with an unsaturated monocarboxylic acid, such as acrylic or methacrylic acid. The reaction between the oxirane bridge of the polyepoxide and the carboxyl group of the unsaturated monocarboxylic acid, leads to the formation of unsaturated epoxy esters soluble in styrene and the resulting solutions can be hardened by peroxide catalysts in the same way as conventional unsaturated polyester resins. Hardening occurs by cross-linking between the double bond of styrene and that of the unsaturated acid interacted with the polyepoxide.

An unsaturated epoxy ester known in the art is for example that which is obtained by reaction of methacrylic acid with the diglycidyl ether of 2,2-bis(4-hydroxyphenyl) propane and which corresponds to the following general formula:

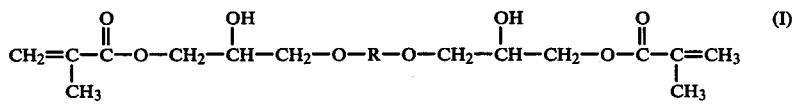

wherein R is the bisphenyl radical of 2,2-bis(4-hydroxyphenyl) propane.

The solution in styrene of this unsaturated epoxy ester hardens by means of peroxides to form hardened products having the characteristics proper to polyepoxides, in addition to those of the conventional unsaturated polyester resins.

Also known in the art is the interaction of epoxy novolak resins and acrylic or methacrylic acid, yielding unsaturated epoxy esters whose solutions in styrene harden by means of peroxides. In this case, one generally obtains a higher degree of cross-linking by hardening, because the epoxy function is higher than that of the unsaturated epoxy ester (I).

Therefore, it is possible to improve some characteristic of the hardened products, especially the toughness, bending strength and tensile strength.

However, it has been ascertained in practice that the increase in the degree of cross-linking affords relatively modest improvements of these characteristics, whereas other characteristics, such as the impact resistance, are affected, said impact resistance having at most undesirably low values.

The present invention provides a hardenable composition comprising an unsaturated epoxy ester and an ethylenically unsaturated monomer copolymerizable with the latter, said composition yielding under the action of peroxides hardened products having surprisingly high values of impact resistance, the other characteristics being similar to those obtained with prior art compositions.

Thus, according to one aspect of the present invention, there is provided a hardenable composition comprising an unsaturated epoxy ester resin and an ethylenically unsaturated monomer copolymerizable with the latter, said monomer being present in the composition in an amount of from 0.4 to 2 parts by weight for each part by weight of said resin, and said resin being the reaction product of an unsaturated monocarboxylic acid or a monoester of an unsaturated bicarboxylic acid with the epoxidation product of epichlorohydrin and a novolak phenolic resin of the structural formula:

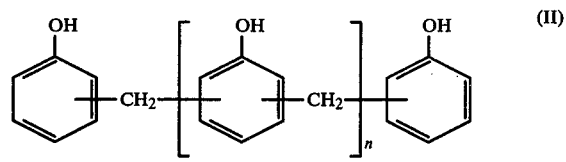

wherein n has an average value of from 0.1 to 0.7.

According to another aspect of the invention, there is provided a process for producing a hardened product, which comprises adding to the above-defined composition an organic peroxide or hydroperoxide, and hardening the resulting mixture.

The value of n in formula (II) is critical and the advantages of the present invention are not obtained when n is beyond the described range.

Epoxidation of the novolak phenolic resin (II) by reaction of the latter with epichlorohydrin in the presence of an alkali metal hydroxide, may be carried out as follows:

A solution of resin (II) in epichlorohydrin is prepared, maintaining the ratio between the moles of epichlorohydrin and the number of phenolic hydroxyls of resin (II) at a value of from 2.5:1 to 12:1 and aqueous alkali metal hydroxide is gradually added to the solution until the number of moles of said alkali metal hydroxide is equivalent, or about equivalent to the number of phenolic hydroxyls of said resin (II).

The reaction is preferably carried out at a temperature of from 60° to 80° C. during the addition of the alkali metal hydroxide, distilling off water from the reaction medium in the form of an azeotropic mixture with epichlorohydrin and recycling the distilled epichlorohydrin, and maintaining at all times the water content of the reaction medium at a value of from 0.5 to 2.5% by weight and the pH at a value of from 7 to 8.

Upon completion of the addition of the aqueous alkali metal hydroxide, the water is completely distilled off from the reaction medium and the epoxy novolak resin is recovered.

When operating according to the described procedure, a practically complete epoxidation of the phenolic hydroxy groups of resin (II) is obtained, while avoiding or at least substantially reducing the side reactions.

The epoxy novolak resin is then reacted with an unsaturated monocarboxylic acid or a monoester of an unsaturated bicarboxylic acid, generally chosen from acrylic, methacrylic, crotonic and itaconic acids, methyl monomaleate and methyl monofumarate.

Preferably the reagents are reacted at a temperature of from 120° to 150° C. for a period of from 1 to 6 hours. Operation is generally carried out in the presence of a catalyst chosen from alkali and alkaline earth metal compounds, such as sodium acetate, ammonium, sodium, potassium and lithium carbonates, or carbonates or acetates of alkaline earth metals, such as calcium and magnesium carbonates or acetates. Satisfactory results are obtained by using from 1 to 6 moles of catalyst for each 100 moles of unsaturated monocarbocyclic acid, or of monoester of unsaturated bicarboxylic acid.

Moreover, the number of moles of unsaturated monocarboxylic acid or of monoester of unsaturated bicarboxylic acid introduced into the reaction medium is preferably equal to, or about equal to the number of epoxy groups of epoxy novolak resin.

In practice, the reaction is continued until the acid value of the reaction medium is equal to or lower than 10.

The unsaturated epoxy ester thus obtained is mixed with styrene, or another known unsaturated monomer capable of reacting with the conventional polyester resins, such as vinyltoluene, alpha-methylstyrene, methyl methacrylate or vinylcyclohexene.

The composition of the present invention preferably contains from 0.6 to 1.5 parts by weight of ethylenically unsaturated monomer for each part by weight of unsaturated epoxy ester.

The composition may be hardened by using organic peroxides or hydroperoxides, such as methyl ethyl ketone peroxide, cyclohexanone peroxide, benzoyl peroxide, cumene hydroperoxide or other peroxides conventionally used in the art for hardening unsaturated polyester resins. The peroxide or hydroperoxide is preferably added in an amount of from 0.2 to 4 parts by weight for each 100 parts by weight of the sum of said epoxy ester resin and said monomer. Conventional additives, such as fillers, pigments and hardening accelerators may be present in the composition and/or added to the composition in the process for producing hardened products.

Examples of suitable hardening accelerators are dimethylaniline and trimethylbenzylammonium chloride, which may be used in amounts of from 0.1 to 2 parts by weight for each 100 parts by weight of the sum of said epoxy ester rsin and said monomer. The accelerators may also be metal salts such as cobalt and vanadium salts, especially the naphthenates and octoates of cobalt, vanadium and vanadyl, or other accelerators conventionally used in the art for hardening unsaturated polyester resins. These metallic accelerators are generally used in amounts of from 0.02 to 1 parts by weight (as metal) for each 100 parts by weight of the sum of said epoxy ester resin and said monomer.

The composition of the present invention is particularly suitable in the field of coatings, in that of mastics, in the production of reinforced plastics, in the electrotechnical field and in the field of inks and paints setting under the action of ultra violet light.

In each case, the hardened products have high bending strength and tensile strength and a surprisingly high impact resistance, as will be shown in the following experimental examples.

EXAMPLE 1

There is used an apparatus comprising a reaction vessel (flask), a mechanical agitator, an electric heater, a distillation column with a condenser, a separating flask for the epichlorohydrin-water distillate with a syphon for recycling into the reaction vessel the heavy epichlorohydrin phase, and a device for regulating the pressure within the apparatus.

3,400 parts by weight of epichlorohydrin and 500 parts by weight of a novolak resin of general formula (II) with n equal to about 0.2, are fed into the flask.

This novolak resin has a molecular weight of 220 and a viscosity of 10 cps, as measured at 25° C. in a 50 wt.% ethanol solution.

The molar ratio between epichlorohydrin and the novolak resin is thus about 16:1 and the ratio between the number of moles of epichlorohydrin and the number of phenolic hydroxy groups of novolak resin is about 7.4:1.

The pressure in the apparatus is brought to 160 mm Hg and the mass is heated to 70° C. 396 parts by weight of a 50 wt.% aqueous solution of sodium hydroxide are then gradually added over a period of 5 hours.

During this addition, the reaction temperature is about 70° C. and the water is removed in the form of an azeotropic mixture with epichlorohydrin, the vapors being condensed and the liquid epichlorohydrin phase being recycled. Under these conditions, the average content of water in the reaction medium is of the order of 1% by weight and the pH value is about 7.5.

Upon completion of the addition of the aqueous sodium hydroxide, the mass is kept boiling for a further 15 minutes. The pressure in the apparatus is then brought to atmospheric pressure and the temperature of the mass to 80° C.

560 Parts by weight of water are gradually added to the agitated mass and the organic layer is separated from the aqueous layer.

The unreacted epichlorohydrin is removed from the organic phase, operating at subatmospheric pressure, and the distillation residue is filtered in order to remove the last traces of inorganic compounds present, using diatomaceous earth as a filter aid.

Thus 600 parts by weight of a novolak epoxy resin are obtained, having the following properties:
  epoxy equivalent: 165
  volatile substances (weight %): 1.3
  chlorine (wt.%): 0.17
  Gardner viscosity at 25° C.: $Z_5$ The epoxy equivalent is the number of grams of resin containing one epoxy group; by chlorine is intended the content of hydrolizable and non-hydrolizable chlorine.

EXAMPLE 2

Operation is as in Example 1, using a novolak resin of general formula (II) in which n is about 0.6. This resin has a molecular weight of 262 and a viscosity of 14 cps, as measured at 25° C. in a 50 wt.% ethanol solution.

The epoxy novolak resin thus obtained has the following properties:
  epoxy equivalent: 168
  volatile substances (wt.%): 1.0
  chlorine (wt.%): 0.8
  Gardner viscosity at 25° C., in 90 wt.% solution in butyl Carbitol: Z

EXAMPLE 3 (Comparative)

Operation is as in Example 1, using a novolak resin of general formula (I) in which n is about 1.7. This resin has a molecular weight of 380 and a viscosity of 26 cps, as measured at 25° C. in a 50 wt.% ethanol solution.

The resulting epoxy novolak resin has the following properties:
  epoxy equivalent: 167
  volatile substances (wt.%): 1 chlorine (wt.%): 0.1
Gardner viscosity at 25° C., in a 85 wt.% solution in methyl ethyl ketone: U+½.

EXAMPLE 4

There is used an apparatus comprising a flask provided with an agitator, a condenser, a thermometer and a device for injecting inert gas.

500 Parts by weight of the epoxy novolak resin of Example 1, 500 ppm of a mixture in equal amounts of hydroquinone and methylbenzylammonium chloride and 100 ppm of triphenylphosphite, are fed into the flask 0.1 parts by weight of sodium carbonate are also added. The temperature is brought to 120°–130° C. and 211 parts by weight of acrylic acid are gradually added, taking care that the temperature will not exceed 150° C.

Upon completion of the addition of acrylic acid, the ratio between the number of epoxy groups and the moles of acrylic acid is equal to 1:0.97. The whole is maintained at the given temperature until the acid number of the reaction medium is 9, intending by acid number the number of milligrams of potassium hydroxide necessary to neutralize one gram of unsaturated epoxy ester.

The mass is then cooled to 80° C. and styrene monomer is added until its amount is 29.3% by weight in the resulting solution. This solution in styrene has a Gardner viscosity of B, as measured at 25° C. The Gardner viscosity of a similar solution containing 40% by weight of styrene is lower than A, still measured at 25° C.

Finally, a solution of the unsaturated epoxy ester in styrene in a 45:55 weight ratio is prepared and this solution is used in the hardening tests.

EXAMPLE 5

Operation is as in Example 4, using the epoxy novolak resin of Example 2. The reaction with acrylic acid is continued until the acid number of the reaction medium is 7.

The styrene solution of the unsaturated epoxy ester thus obtained, containing 28.5% by weight of styrene, has a Gardner viscosity at 25° C. equal to K. The Gardner viscosity of a similar solution containing 40% by weight of styrene is equal to A, still measured at 25° C.

Finally, a solution containing 55% by weight of styrene is prepared as in Example 4.

EXAMPLE 6

(Comparative)

Operation is as in Example 4, using the epoxy novolak resin of Example 3.

The reaction with acrylic acid is continued until the acid value of the reaction medium is 8.5.

The solution of unsaturated epoxy ester in styrene containing 28% by weight of styrene has a Gardner viscosity of U+½ at 25° C. The Gardner viscosity of a similar solution containing 40% by weight of styrene is equal to B, still measured at 25° C.

Finally, a solution containing 55% by weight of styrene is prepared as in Example 4.

HARDENING TESTS 0.4 Parts by weight of cobalt octoate containing 6% by weight of metallic cobalt, and 1.5 parts by weight of methyl ethyl ketone peroxide are added to 100 parts by weight of each of the solutions of unsaturated epoxy ester in styrene prepared in Examples 4, 5 and 6.

Test-pieces obtained from the three resulting mixtures by hardening for 15 days at 20° C. are submitted to analysis. The results of the tests are reported in the Tables under A.

A part of these hardened test-pieces is submitted to a thermal treatment at 150° C. for 200 hours and the remaining part to a thermal treatment at 150° C. for 24 hours.

The results of the determinations carried out on the thus treated test-pieces are reported in the tables under B and C, respectively.

The results relating to the composition of Example 4 are reported in Table 1, those relating to the composition of Example 5 in Table 2 and those relating to the composition of Example 6 in Table 3.

Table 1

|  | A | B | C |
|---|---|---|---|
| Bending strength (kg/cm$^2$) | 566 | 1087 | 1270 |
| Flexural modulus (kg/cm$^2$) | 18,000 | 32,000 | 31,000 |
| Tensile strength (kg/cm$^2$) | 486 | 506 | 458 |
| Tensile modulus (kg/cm$^2$) | 23,200 | 35,000 | 34,100 |
| Elongation (%) | 4.86 | 1.52 | 1.70 |
| Impact strength (kg/cm/cm$^2$) | 11.83 | 11.18 | 10.78 |
| H.D.T. (°C.) | 47 | 106 | 90 |
| Water absorption (wt. %) | 0.13 | 0.19 | 0.14 |
| Barcol hardness (ASTM-D-1706) | 35 | 52 | 50 |

Table 2

|  | A | B | C |
|---|---|---|---|
| Bending strength (kg/cm$^2$) | 581 | 1099 | 1170 |
| Flexural modulus (kg/cm$^2$) | 18,300 | 31,400 | 31,800 |
| Tensile strength (kg/cm$^2$) | 456 | 641 | 575 |
| Tensile modulus (kg/cm$^2$) | 22,400 | 32,500 | 32,100 |
| Elongation (%) | 4 | 1.9 | 2.2 |
| Impact strength (kg/cm/cm$^2$) | 20 | 11.7 | 11.4 |
| H.D.T. (°C.) | 46 | 111 | 98 |
| Water absorption (wt. %) | 0.13 | 0.20 | 0.15 |
| Barcol hardness (ASTM-D-1706) | 34 | 51 | 49 |

Table 3

|  | A | B | C |
|---|---|---|---|
| Bending strength (kg/cm$^2$) | 770 | 928 | 1090 |
| Flexural modulus (kg/cm$^2$) | 24,000 | 30,000 | 30,900 |
| Tensile strength (kg/cm$^2$) | 507 | 636 | 730 |
| Tensile modulus (kg/cm$^2$) | 23,800 | 30,300 | 30,100 |
| Elongation (%) | 2.96 | 2.38 | 3.1 |
| Impact strength (kg./cm/cm$^2$) | 2.57 | 2.38 | 2.4 |
| H.D.T. (°C.) | 49 | 120 | 108 |
| Water absorption (wt. %) | 0.9 | 0.12 | 0.17 |
| Barcol hardness (ASTM-D-1706) | 34 | 53 | 51 |

All the determinations have been carried out according to the ASTM standards.

We claim:

1. A hardenable composition which provides a hardened composition of improved impact resistance comprising an unsaturated epoxy ester resin and an ethylenically unsaturated monomer copolymerizable with the latter, said monomer being present in the composition in an amount of from 0.4 to 2 parts by weight for each part by weight of said resin, and said resin being the reaction product of an unsaturated monocarboxylic acid or a monoester of an unsaturated bicarboxylic acid with the epoxidation product of epichlorohydrin and a novolak phenolic resin of the structural formula:

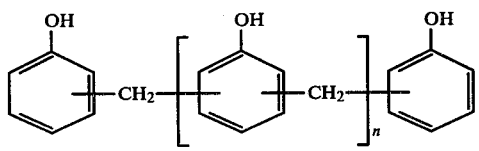

wherein n has an average value of 0.2 or 0.6, said reaction product being obtained in a reaction system which comprises water, the water content of the reaction system being maintained at a value of from 0.5 to 2.5% by weight and the pH of the reaction system being maintained at a value of from 7 to 8.

2. A hardenable composition of claim 1, wherein said unsaturated monocarboxylic acid is selected from the group consisting of acrylic, methacrylic, crotonic and itaconic acids.

3. The hardenable composition of claim 1, wherein said monoester is selected from the group consisting of methyl monomaleate and methyl monofumarate.

4. The hardenable composition of claim 1, wherein said monomer is selected from the group consisting of styrene, vinyltoluene, alpha-methylstyrene, methyl methacrylate and vinylcyclohexene.

5. The hardenable composition of claim 1, wherein said monomer is present in an amount of from 0.6 to 1.5 parts by weight for each part by weight of said epoxy ester resin.

6. The hardenable composition of claim 1, wherein said monomer is styrene.

7. A process for producing a hardened product of improved impact resistance, which comprises adding a catalytic amount of an organic peroxide or hydroperoxide to a hardenable composition comprising an unsaturated epoxy ester resin and an ethylenically unsaturated monomer copolymerizable with the latter, said monomer being present in the composition in an amount of from 0.4 to 2 parts by weight for each part by weight of said resin, and said resin being the reaction product of an unsaturated monocarboxylic acid or a monoester of an unsaturated bicarboxylic acid with the epoxidation product of epichlorohydric and a novolak phenolic resin of the structural formula:

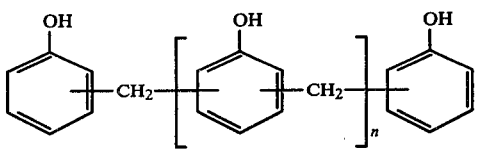

wherein n has an average value of 0.2 or 0.6, said reaction product being obtained in a reaction system which comprises water, the water content of the reaction system being maintained at a value of from 0.5 to 2.5% by weight and the pH of the reaction system being maintained at a value of from 7 to 8, and hardening the resulting mixture.

8. The process of claim 7, wherein said organic peroxide or hydroperoxide is selected from the group consisting of methyl ethyl ketone peroxide, cyclohexanone peroxide, benzoyl peroxide and cumene hydroperoxide.

9. The process of claim 7, wherein said peroxide or hydroperoxide is added in an amount if from 0.2 to 4 parts by weight for each 100 parts by weight of the sum of said epoxy ester resin and said monomer.

10. The process of claim 7, wherein a hardening accelerator selected from the group consisting of dimethylaniline and trimethylbenzylammonium chloride is added to the composition in an amount of from 0.1 to 2 parts by weight for each 100 parts by weight of the sum of said epoxy ester resin and said monomer.

11. The process of claim 7, wherein a hardening accelerator selected from the group consisting of naphthenates and octoates of cobalt, vanadium and vanadyl is added to the composition in an amount of from 0.02 to 2 parts by weight (as metal) for each 100 parts by weight of the sum of said epoxy resin and said monomer.

12. The hardenable composition of claim 1, wherein n has an average value of 0.2.

13. The process of claim 7, wherein n has an average value of 0.2.

* * * * *